United States Patent
Bechtold et al.

(10) Patent No.: US 7,879,487 B2
(45) Date of Patent: Feb. 1, 2011

(54) BATTERY HAVING SEALED CONTACT TERMINAL BUSHING

(75) Inventors: Dieter Bechtold, Garbsen (DE); Kai Pelz, Springe (DE); Ralf Joswig, Bucholz (DE)

(73) Assignee: Varta Automotive Systems GmbH, Hannover (DE)

( * ) Notice: Subject to any disclaimer, the term of this patent is extended or adjusted under 35 U.S.C. 154(b) by 846 days.

(21) Appl. No.: 10/560,376

(22) PCT Filed: Apr. 14, 2004

(86) PCT No.: PCT/DE2004/000767

§ 371 (c)(1),
(2), (4) Date: Dec. 12, 2005

(87) PCT Pub. No.: WO2004/114436

PCT Pub. Date: Dec. 29, 2004

(65) Prior Publication Data

US 2006/0127759 A1     Jun. 15, 2006

(30) Foreign Application Priority Data

Jun. 14, 2003    (DE) ................. 103 26 906

(51) Int. Cl.
*H01M 2/00* (2006.01)
*H01M 2/02* (2006.01)
*H01M 2/08* (2006.01)

(52) U.S. Cl. ............ 429/175; 429/163; 429/178; 429/180; 429/181; 429/182; 429/183; 429/184; 429/185

(58) Field of Classification Search ............... 429/163, 429/175, 178, 180–185
See application file for complete search history.

(56) References Cited

U.S. PATENT DOCUMENTS 5,558,950 A * 9/1996 Ovshinsky et al. .......... 429/101
5,893,959 A    4/1999 Muellich (Continued)

FOREIGN PATENT DOCUMENTS

DE    2833416 B1    9/1979

(Continued)

OTHER PUBLICATIONS

Laser Welding of Plastics, TWI World Centre for Materials Joining Technology (Aug. 2000), www.twi.co.uk (6 pages).*

(Continued)

*Primary Examiner*—Dah-Wei D Yuan
*Assistant Examiner*—Steven Scully
(74) *Attorney, Agent, or Firm*—Foley & Lardner LLP

(57) ABSTRACT

A rechargeable battery includes a housing having a housing wall, at least one cell in the housing, and a contact element electrically connected to the at least one cell. The rechargeable battery also includes a plastic sealing element extrusion-coated on the contact element. The sealing element includes a supporting surface which lies flat against the housing wall at an interface. The supporting surface is transmission laser-welded to the housing wall at the interface. One of the supporting surface and the housing wall is at least partially transparent for the laser beam and the other of the supporting surface and the housing wall is absorbent for the laser beam.

20 Claims, 2 Drawing Sheets

U.S. PATENT DOCUMENTS

| | | |
|---|---|---|
| 6,444,946 B1 | 9/2002 | Korte |
| 2001/0023038 A1* | 9/2001 | Ligeois et al. ............... 429/161 |
| 2002/0070215 A1* | 6/2002 | Walsh et al. .................... 220/6 |
| 2003/0203278 A1* | 10/2003 | Hamada et al. ............. 429/156 |

FOREIGN PATENT DOCUMENTS

| | | | |
|---|---|---|---|
| DE | 19916786 A1 | | 10/2000 |
| EP | 0105416 B1 | | 4/1984 |
| GB | 2026761 | * | 2/1980 |
| GB | 2026761 A | | 2/1980 |
| WO | WO 02/055287 A1 | | 7/2002 |

OTHER PUBLICATIONS

International Search Report for PCT/DE2004/000767, date mailed Aug. 6, 2005, 2 pages.

* cited by examiner

BATTERY HAVING SEALED CONTACT TERMINAL BUSHING

CROSS-REFERENCE TO RELATED PATENT APPLICATIONS

The present application is a National Stage of International Application PCT/DE2004/000767, filed Apr. 14, 2004, which claims the benefit of German Priority Application DE 103 26 906.1, filed Jun. 14, 2003. The entire disclosures of International Application PCT/DE2004/000767 and German Priority Application DE 103 26 906.1 are incorporated by reference herein in their entirety, including their specifications, drawings, claims and abstracts.

BACKGROUND

The present invention relates to a rechargeable batteries and methods for producing sealed contact terminal bushings for rechargeable batteries.

Gas-tight and liquid-tight pole seals for rechargeable batteries are known from DE 28 33 416 B1 and EP 0 105 416 B1, in which the pole bots which are used to make contact with the cells are extrusion-coated with a body composed of a thermoplastic. The body is brought into contact with the housing cover of the rechargeable battery and is welded using the hot-tool welding process, thus forming a circumferential welded edge on the outside between the body and the cover. Ultrasound welding process or friction welding processes have also been proposed, instead of the hot tool welding process.

These pole seals are suitable for lead-acid rechargeable batteries but not, it contrast, for nickel metal hydride (NiMH) and lithium-ion batteries owning to the materials used (for example nickel, aluminum, copper, steel).

Accordingly, there is a need to provide an improved rechargeable battery (e.g., a lithium-ion or NiMH battery) and a method of producing such a battery. There is also a need to provide rechargeable batteries having improved pole seals.

SUMMARY

An exemplary embodiment of the invention relates to a rechargeable battery that includes a housing having a housing wall, at least one cell in the housing, and a contact element electrically connected to the at least one cell. The rechargeable battery also includes a plastic sealing element extrusion-coated on the contact element. The sealing element includes a supporting surface which lies flat against the housing wall at an interface. The supporting surface is transmission laser-welded to the housing wall at the interface. One of the supporting surface and the housing wall is at least partially transparent for the laser beam and the other of the supporting surface and the housing wall is absorbent for the laser beam.

Another exemplary embodiment of the invention relates to a method for producing a rechargeable battery that includes providing a rechargeable battery including a housing wall, a plurality of cells, and a plurality of sealed contact terminals, the contact terminals being electrically connected to at least one of the cells and being passed through the housing wall. The method also includes extrusion coating the contact terminals with a plastic sealing element having a supporting surface which is configured to rest flat against the housing wall. The method also includes providing the supporting surface of the plastic sealing element in contact with the housing wall and transmission laser welding the supporting surface to the housing wall with a laser beam. The housing wall is at least partially transparent for the laser beam and the supporting surface is reflective for the laser beam. The laser beam strikes the supporting surface through the housing wall to weld the supporting surface to the housing wall such that a weld bead is formed around the contact element and on a contact surface between the supporting surface and the housing wall.

BRIEF DESCRIPTION OF THE DRAWINGS

The invention will be explained in more detail in the following text using the attached drawings, by way of example, in which.

DETAILED DESCRIPTION

Figure 1:
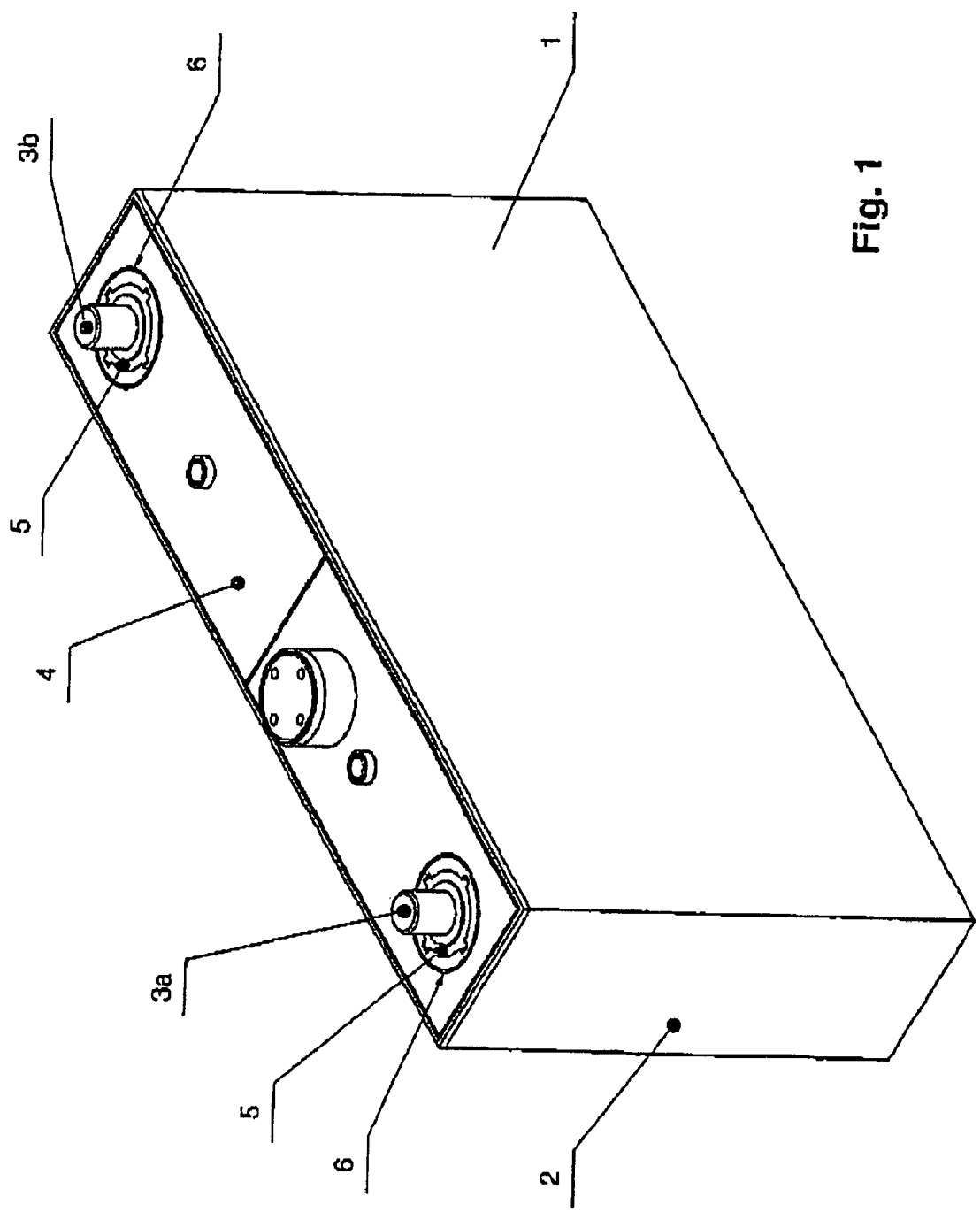
FIG. 1 shows a perspective view of a rechargeable battery with a plastic housing and the with pole bolts which are passed out of the plastic housing.

According to an exemplary embodiment, an improved rechargeable battery, in particular a nickel metal hydride or lithium-ion rechargeable battery, is provided that includes at least one cell in a housing and contact elements (e.g., pole bolts, intercell contacts, etc.) that are passed through a housing wall (e.g., a wall separating adjacent cells, a cover for a battery housing, etc,) such that a seal is formed. According to one such exemplary embodiment, a rechargeable battery is provided that includes at least one cell in a housing and contact elements which are electrically connected to at least one cell and are passed through a housing wall, with each of the contact elements being extrusion-coated with a plastic sealing element, and the plastic sealing elements each having a supporting surface which lies flat on the housing wall.

According to an exemplary embodiment, a rechargeable battery of this generic type may be manufactured such that the supporting surface is transmission laser-welded to the housing wall (e.g., a first welded part (the supporting surface) is welded to a second welded part (the housing wall)) which is directly adjacent to it by means of a weld bead, which is circumferential around the contact element on the contact surface between the supporting surface and the housing wall, and one of the two welded parts is at least partially transparent for laser beam and the other welded part is absorbent for the laser light, so that the supporting surface can be welded by means of a laser beam and absorption on the supporting surface to the housing wall as the laser beam passes through the other adjacent welded part.

With the aid of transmission laser welding method, which is in principle known, for example from DE 199 16 786 A1, for connection of vertical tubular and/or wall elements composed of laser-transparent and/or laser-absorbent plastic, it is possible to produce a non-contacting, wear-free joint between a plastic sealing element and housing wall with as little heat as possible being introduced. The transmission laser welding method requires relatively short process times, and is thus relatively fast. Furthermore, the tooling costs are relatively low, and the transmission laser welding method offers relatively high flexibility during manufacture.

The welding of the supporting surface of the plastic sealing element to the housing wall by means of a weld bead on the contact surface between the supporting surface and the housing wall instead of the weld bead, which is produced in conventional hot-tool welding, to the outer edge furthermore has the advantage that no dead space is required and the plastic sealing element can be welded to the housing wall only by means of the transmission laser welding method, for manufacturing reasons.

It is advantageous for the contact elements provided in the form of pole bolts to have circumferential projections on their circumference, an for the plastic sealing element to completely surround the projections. This results in sealing against gas and liquid that is better than that when using extrusion-coating of a smooth contact element. Alternatively or additionally for this purpose, the contact elements may also have circumferential depressions on their circumference, with the plastic sealing element completely filing the depression, once this has been extrusion-coated around the contact element in the area of the projections and/or depressions.

In order to improve the absorption characteristics, the supporting surface of the plastic sealing element and/or the housing wall preferably has additives or fillers in the area of the associated supporting surface. Alternatively or additionally for this purpose, a colored layer which absorbs laser light can also be provided in order to improve the absorption characteristics on the supporting surface and/or on that surface of the housing wall which abuts directly onto the supporting surface.

When the laser light passes through the hosing wall, which is transparent to laser light, it is absorbed or possibly partially reflected on the laser-light-absorbent supporting surface of the plastic sealing element, such that the supporting surface is heated and is welded to the adjacent housing wall.

However, the laser beam can also be absorbed on the boundary surface between the housing wall and the plastic sealing element, so that the entire surface of the housing wall is heated.

It is particularly advantageous for the plastic sealing element to have grooves for holding the housing wall. The plastic sealing element can then be clamped to the housing wall in a liquid-tight manner by means of the grooves in the area of an aperture through the housing wall. This embodiment is particularly suitable for cell connectors which are passed from one cell though an intermediate wall to the adjacent cell. In this case, it is not absolutely essential for the grooves to be welded to the housing wall. The grooves can thus advantageously be used in those areas which are not accessible for the transmission laser welding method during manufacture.

The contact elements may be pole bolts which are passed outwards through a housing cover or may be cell connectors which are passed through an intermediate wall in the battery housing for connection of adjacent cells.

According to an exemplary embodiment, an improved method is provided for production of a sealed contact terminal bushing for rechargeable batteries as described above, In this manner, a method is provided for production of a sealed contact terminal bushing for rechargeable batteries, with the contact terminals being electrically connected to at least one cell and being passed through a housing wall, is also provided.

According to an exemplary embodiment, the method includes the following steps: (a) extrusion coating of the contact terminals with a plastic sealing element with the plastic sealing element having a supporting surface which can rest flat on the housing wall; (b) application of the supporting surface of the plastic sealing element to the housing wall; (c) transmission laser welding of the supporting surface to the immediately adjacent housing wall by means of a laser beam, which strikes the supporting surface through the at least partially transparent housing wall, which supporting surface is absorbent such that it is welded to the adjacent housing wall, with the weld bead running around the contact element and lying on the contact surface between the supporting surface and the housing wall.

Thus, according to an exemplary embodiment, in a conventional contact terminal bushing which is extrusion-coated with a plastic sealing element, the plastic sealing element which rests on the housing wall is welded in place by means of a transmission laser welding method. In this case, the laser light is passed through the at least partially transparent housing wall to a supporting surface which absorbs laser light. The supporting surface is heated by the absorption and possibly partial reflection of the laser light, so that the supporting surface is welded to the adjacent housing wall on the contact surface between the supporting surface and the housing wall.

In order to improve the absorption characteristics, additives or fillers can be introduced into the plastic material before the extrusion coating of the contact terminals. However, it is also possible to apply a colored layer, which absorbs laser light, to the supporting surface and/or to that surface of the housing wall which is intended to make contact with the supporting surface, in order to improve the absorption characteristics.

In particular, in order to mount the contact terminal bushing on the housing wall in a liquid-tight manner at points which are not accessible for the transmission laser welding method, it is advantageous to incorporate grooves in the plastic sealing element and to clamp the plastic sealing element onto the housing wall by means of the grooves. It is then no longer absolutely essential to carry out any further welding in the area of the grooves.

FIG. 1 shows a rechargeable battery 1 with a plastic housing 2 which is closed such that is it liquid-tight and gas-tight, and through which pole bolts 3a, 3b are passed for electrical connection of the rechargeable battery 1. The pole bolts 3a, 3b project through the housing cover 4 of the plastic housing 2, and out of it. They are extrusion-coated with a plastic sealing element 5, part of which is passed to the exterior through a hole in the housing cover 4.

According to an exemplary embodiment, the plastic sealing elements 5 are welded to the housing cover 4 using a transmission laser welding method, by passing a laser beam through the housing cover 4, which is at least partially transparent for laser light, with the laser beam striking the supporting surface for the plastic sealing element 5, which resets on the housing cover 4. This supporting surface for the plastic sealing element 5 absorbs laser light so that heat is produced, which melts the supporting surface of the plastic sealing element 5 and welds it to the housing cover 4. The weld bead 6 produced in this way is located on the contact surface (i.e., at the interface) between the supporting surface of the plastic sealing element 5 and the housing cover 4 and runs circumferentially, without any seam, around the pole bolts 3a and 3b. In order to produce this weld bead 6, the housing cover 4 is pressed, for example by means of a clamping apparatus, onto the plastic sealing element 5 such that a contact is ensured between the supporting surface and the housing cover 4 during the transmission laser welding.

In order to ensure adequate absorption of the contact surface, the plastic sealing element 5 may have appropriate additives or fillers, in particular on the supporting surface. However, it is also feasible to increase the absorption and possibly reflection characteristics of the contact surface between the supporting surface of the plastic sealing element 5 and the housing wall, for example the housing cover 4, by the application of ink, preferably using a colored layer which absorbs laser light.

Figure 2:
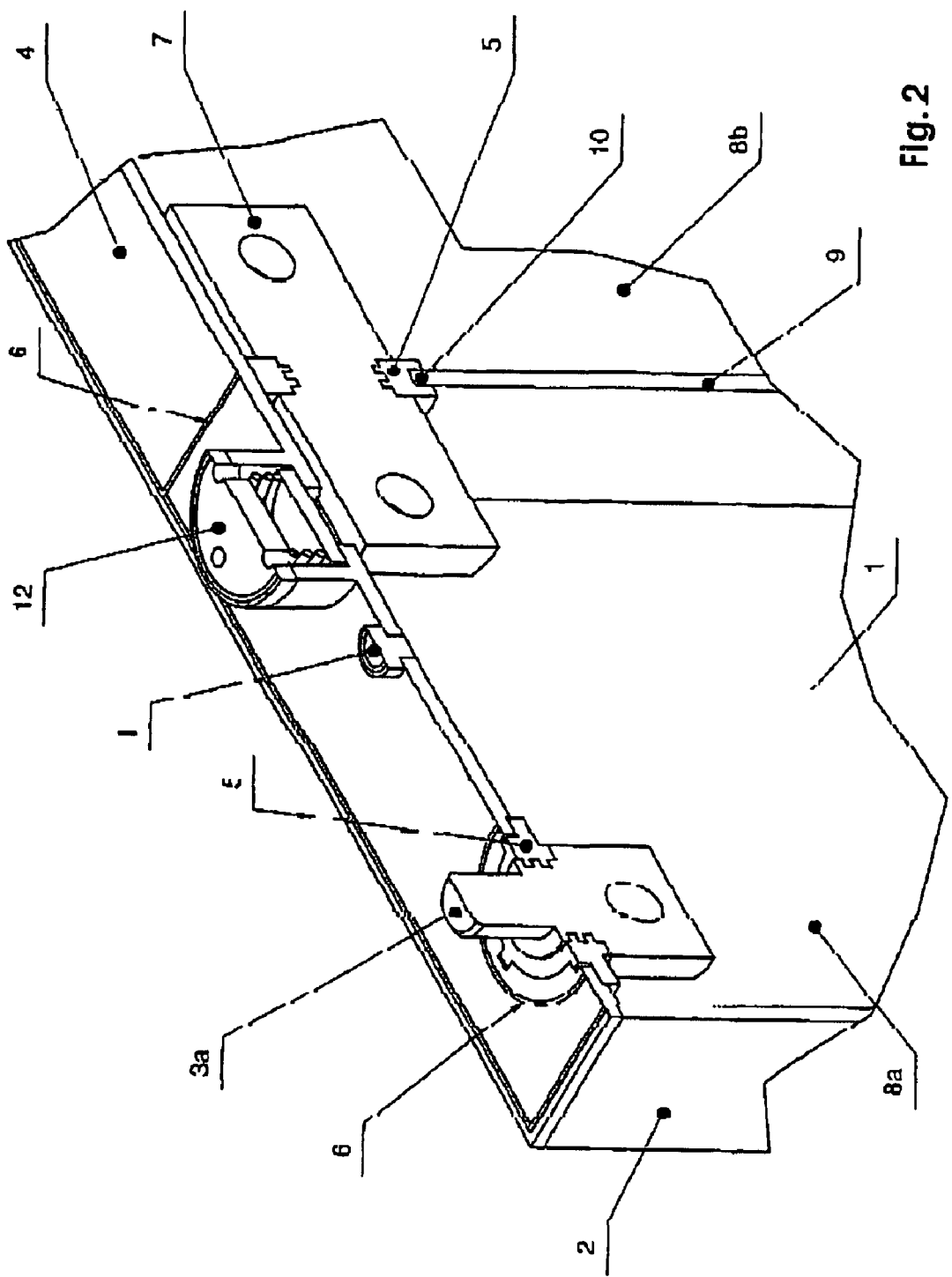
FIG. 2 shows a section view through a detail of the rechargeable battery shown in FIG. 1.

FIG. 2 shows a section view through a detail of the rechargeable battery 1 shown in FIG. 1. As can be seen clearly, this shows that the plastic sealing element 5 is extrusion-coated around the circumference of the pole bolt 3 such that is is liquid-tight and gas-tight. In this case, depressions in the form of circumferential grooves are provided on the circumference of the pole bolt 3, and are completely filled by the plastic sealing element 5. The plastic sealing element 5 has a flange with a supporting surface which rests flat on the inner face of the housing cover 4. In the area of flange, the plastic sealing element 5 is connected by means of a seamlessly circumferential weld bead 6 to the housing cover 4, using a transmission laser welding method. This ensures a liquid-tight and gas-tight busing for the pole bolt 3 through the housing cover 4.

As can also be seen, a cell connector 7 is provided for the electrical connection of the left-hand cell 8a to the right-hand cell 8b. This cell connector 7 is passed through an intermediate wall 9 which has an aperture for the cell connector 7. The cell connector 7 is extrusion-coated with a plastic sealing element 5, in which case additional depressions or grooves are likewise provided, and are completely filled by the plastic sealing element 5.

A groove 10 is provided on the side edges and the lower edge of the plastic sealing element 5 in order to clamp the plastic sealing element 5 onto the intermediate wall 9, such that it is liquid-tight. There is then no longer any need for welding in the area of the groove 10. The plastic sealing element 5 is just welded on the supporting surface to the housing cover 4 (i.e., a housing wall) by means of the transmission laser welding method. The resulting weld bead is represented in FIG. 2 as a weld bead 6 formed in a straight line parallel to the shorter side of the housing 2 of the battery 1.

The cell connectors 7 may be formed from one or more parts. Contact may be made with the cell connectors 7 using detachable or rigid processes in a known manner, for example by means or screws, rivets, welds, clinches, pressing or bevel-bend joining.

Furthermore, filing openings 11 and valve openings 12 may be provided in a known manner in the housing cover 4. These filling and valve openings 11, 12 can also advantageously be transmission laser-welded.

It is important to note that the construction and arrangement of the rechargeable battery as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values or parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied. Accordingly, all such modifications are intended to be included within the scope of the present invention as defined in the appended claims. The order or sequence of any process or method steps may be varied or re-sequenced according to other exemplary embodiments. Other substitutions, modifications, changes and omissions may be made in the design, operating conditions and arrangement of the various exemplary embodiments without departing from the scope of the present invention as expressed in the appended claims.

What is claimed is:

1. A rechargeable battery comprising:
   a housing having a housing wall;
   at least one cell in the housing;
   a contact element electrically connected to the at least one cell; and
   a plastic sealing element provided on the contact element, the sealing element comprising a supporting surface which lies flat against the housing wall at an interface and a second surface extending at substantially a right angle to the supporting surface; the supporting surface and the second surface of the sealing element in contact with the housing wall such that there is no open space between the sealing element and the housing wall;
   wherein one of the supporting surface and the housing wall is at least partially transparent for a laser beam and the other of the supporting surface and the housing wall is absorbent for the laser beam.

2. The rechargeable battery of claim 1, wherein the contact element is a pole bolt that extends through the housing wall.

3. The rechargeable battery of claim 2, wherein the pole bolt comprises circumferential projections.

4. The rechargeable battery of claim 1, wherein the contact element is a cell connector that connects a first cell to a second cell.

5. The rechargeable battery of claim 1, wherein the housing wall is at least partially transparent for the laser beam and the supporting surface is absorbent for the laser beam.

6. The rechargeable battery of claim 1, wherein the supporting surface is at least partially transparent for the laser beam and the housing wall is absorbent for the laser beam.

7. The rechargeable battery of claim 1, wherein the interface between the supporting surface and the housing wall comprises a weld bead that is circumferential around the contact element.

8. The rechargeable battery of claim 1, wherein the contact element has a circumference and comprises circumferential projections on its circumference.

9. The rechargeable battery of claim 8, wherein the plastic sealing element completely surrounds the projections.

10. The rechargeable battery of claim 9, wherein the contact element comprises circumferential depressions on its circumference.

11. The rechargeable battery of claim 10, wherein the plastic sealing element completely fills the circumferential depressions.

12. The rechargeable battery of claim 1, wherein at least one of the supporting surface and the housing wall comprise at least one of an additive and a filler to improve absorption characteristics.

13. The rechargeable battery of claim 12, wherein at least one of the supporting surface and the housing wall comprises a colored layer which absorbs laser light to improve the absorption characteristics.

14. The rechargeable battery of claim 1, wherein the plastic sealing element comprises grooves for holding the housing wall.

15. The rechargeable battery of claim 14, wherein the plastic sealing element is clamped to the housing wall in a liquid-tight manner using the grooves in the area of an aperture through the housing wall.

16. A rechargeable battery comprising:
   a housing having a housing wall, the housing wall having at least one aperture;
   at least one cell provided in the housing;
   a contact element electrically connected to the at least one cell; and a plastic sealing element coupled to the contact element, the sealing element provided in the at least one aperture of the housing wall such that there is no open space between the sealing element and the aperture of the housing wall, the sealing element comprising a supporting surface which lies flat against the housing wall at an interface and an adjacent surface extending at substantially a right angle to the supporting surface;

wherein the supporting surface is coupled to the housing wall at the interface; and wherein one of the supporting surface and the housing wall is at least partially transparent for a laser beam and the other of the supporting surface and the housing wall is absorbent for the laser beam.

17. The rechargeable battery of claim 16, wherein the contact element is a pole bolt that extends through the housing wall and wherein the plastic sealing element is extrusion-coated on the pole bolt.

18. The rechargeable battery of claim 16, wherein the contact element is a cell connector that connects a first cell to a second cell and wherein the plastic sealing element is extrusion-coated on the cell connector.

19. The rechargeable battery of claim 16, wherein the housing wall is at least partially transparent for the laser beam and the supporting surface is absorbent for the laser beam.

20. The rechargeable battery of claim 16, wherein the supporting surface is at least partially transparent for the laser beam and the housing wall is absorbent for the laser beam.

* * * * *